(12) United States Patent
Sachdeva et al.

(10) Patent No.: US 12,001,501 B1
(45) Date of Patent: Jun. 4, 2024

(54) SYSTEM AND METHOD FOR USING INSPECT ELEMENT FRAMEWORK FOR BUILDING MOBILE DAP CONTENT

(71) Applicant: Whatfix Private Limited, Bangalore (IN)

(72) Inventors: Sahil Sachdeva, Bangalore (IN); Shreyas Arunkumar, Bangalore (IN)

(73) Assignee: WHATFIX PRIVATE LIMITED, Bangalore (IN)

( * ) Notice: Subject to any disclaimer, the term of this patent is extended or adjusted under 35 U.S.C. 154(b) by 0 days.

(21) Appl. No.: 18/174,760

(22) Filed: Feb. 27, 2023

(51) Int. Cl.
  *G06F 16/957* (2019.01)
  *G06F 3/04812* (2022.01)
  *G06F 3/0482* (2013.01)

(52) U.S. Cl.
  CPC ........ *G06F 16/957* (2019.01); *G06F 3/04812* (2013.01); *G06F 3/0482* (2013.01)

(58) Field of Classification Search
  CPC ... G06F 16/957; G06F 3/04812; G06F 3/0482
  See application file for complete search history.

(56) References Cited

U.S. PATENT DOCUMENTS

| | | | |
|---|---|---|---|
| 2018/0275835 A1* | 9/2018 | Prag | G06F 3/04842 |
| 2021/0081985 A1* | 3/2021 | Xu | G06Q 30/0242 |
| 2022/0244791 A1* | 8/2022 | Li | G06F 1/163 |

\* cited by examiner

*Primary Examiner* — Andrey Belousov
(74) *Attorney, Agent, or Firm* — PATENT LAW WORKS LLP

(57) ABSTRACT

A technique for inspecting screen elements of a mobile device with a laptop or desktop computer displays a screen-shot of the mobile device. Visible screen elements are identified as the user moves a user interface pointer over the screen-shot. Individual screen elements are highlighted and a user may select individual screen elements. Additional information regarding screen element identification and attributes may be displayed. The screen element attributes may be captured for use in generating DAP content for a mobile device.

12 Claims, 11 Drawing Sheets

Laptop/Desktop Device
Displaying DAP Web App Dashboard

SYSTEM AND METHOD FOR USING INSPECT ELEMENT FRAMEWORK FOR BUILDING MOBILE DAP CONTENT

TECHNICAL FIELD

The present disclosure is related to inspecting elements of a screen of a mobile device.

BACKGROUND

A digital adoption platform (DAP) is a type of software that is layered on top of another software, app, or website to help facilitate end user proficiency by helping to guide users through key tasks and provide contextual information as users navigate the user interface of the product. Users are provided with information to help familiarize them and become more proficient. This helps to drive adoption.

For example, a DAP may generate a help tip. Background information on an example DAP implementation is found in various sources, including U.S. Pat. No. 11,372,661 assigned to Whatfix Private Limited, the contents of which are hereby incorporated by reference. A DAP supports content authoring modules and content playback modules to generate, for example, smart tips as a user navigates elements of a user interface of an underlying software application.

A DAP supports content creators creating new flows or other guided features to enable higher adoption of client applications. Content Creators can create content, record a flow, and the content is played back in the same flow as and when required when end-user clients navigate the client application. This requires the DAP to find the visual UI elements on the application the user is looking at (e.g., finding where the user's cursor is located on a graphical user interface).

DAP solutions may be used with mobile applications (e.g., providing help for users of mobile computing devices to navigate mobile applications running on smartphones, tablet devices, etc.). Content creators create content available to end users through their mobile devices. However, the small screen size of a mobile computing device, relative to a laptop or desktop computer, makes it cumbersome to create DAP content directly on the small screen size of a mobile computing device, such as a smartphone.

Content authoring on a mobile device is preferably done on a larger desktop screen. However, there are problems with using existing tools to inspect mobile device screen elements for a DAP. There is software like UiAutomatorViewer® and Xcode Accessibility Inspector® that can help an application developer to inspect an Android or iOS screen on their development workstation. But this needs a specific Software like XCode® or drivers like Android Development Bridge® (ADB) to be installed in the desktop. Also, they can't identify web elements.

SUMMARY

An apparatus, system, and method is disclosed to inspect screen elements and identify screens for mobile device. An example of a method of inspecting a mobile device screen by a larger screen device to identify screens for a mobile digital adoption platform (DAP) includes capturing a screen-shot of a mobile computing device having an associated screen element hierarchy for screen elements of the screen-shot. The method includes displaying, on a display screen of a computer, the screen-shot of the mobile computing device. At least one user interface command is received, via the computer, to select an element of the screen-shot. Element attributes are captured that are associated with the selected element.

In one implementation, the screen-shot is displayed on a dashboard of a Web application.

In one implementation, the method further includes determining a user interface pointer position and matching the user interface pointer position with boundaries of visible screen elements of the screen-shot.

In one implementation, the method further includes highlighting elements of the screen-shot in response to a user hovering a user interface pointer over a screen element.

In one implementation, highlighting elements of the screen-shot includes identifying a smallest element the user interface pointer is hovering over.

In one implementation, the at least one user interface command includes a command to click on an element of the screen-shot to select it.

In one implementation, the method further includes displaying element attributes of the selected element on the screen of the computer.

In one implementation, the method further includes storing the screen element attributes in a database to support mobile DAP.

In one implementation, the method further includes comprising detecting if an element is a web element or a native element, and in response identifying to the user whether the element is a web element or a native element. In one implementation, the detecting and identifying occur in response to a user hovering a user interface pointer over a screen element.

In one implementation the method further includes, in response to identifying a web element, determining whether the web element is identifiable.

In one implementation the method further includes comprising in response to determining the web element is non-identifiable, generating an indication that the web element is non-identifiable.

In one implementation, a method of inspecting screen elements of a mobile device for a mobile digital adoption platform (DAP), includes initiating, in response to a user command, a capture of a screen-shot of a mobile computing device having an associated screen element hierarchy for the screen elements of the screen-shot. The method includes displaying the screen-shot on a dashboard of display screen of a computer. The method includes determining coordinates of a user interface pointer of the computer with respect to the screen-shot displayed on the computer screen of the user. The method includes, in response to the user interface pointer hovering over a visible screen element of the screen-shot, highlighting the screen element. The method includes in response to user selecting the highlighted element, capturing element attributes of the highlighted element.

In one implementation, a system to inspect elements of a mobile screen for generating content for a digital adoption platform (DAP) includes a dashboard server, the dashboard server configured to inspect elements of the mobile screen.

DETAILED DESCRIPTION

A technique to inspect mobile screen elements on a larger screen computer is disclosed. An application of the technique is to support a mobile DAP solution. A mobile DAP solution provides a way for content authors to create content using a computer (laptop or desktop) where a representation of the actual mobile device UI screen is shown and the user interface elements of a mobile application can be accessed from their computer to create the DAP content. The representation of the actual mobile user interface can be generated using a captured screen-shot and a screen hierarchy, where the screen hierarchy may, for example, be a JSON structure which contains all the elements of a mobile screen-shot along with their respective attributes (including location). In one implementation, the technique support screen element inspection for both native as well as web elements of a mobile device screen-shot.

The overall approach can be described as an inspect element framework. DAP content is created via an inspect element framework on the computer for mobile apps. The mobile app elements that are selected on the dashboard are used as identifiers for the DAP content.

Figure 1:
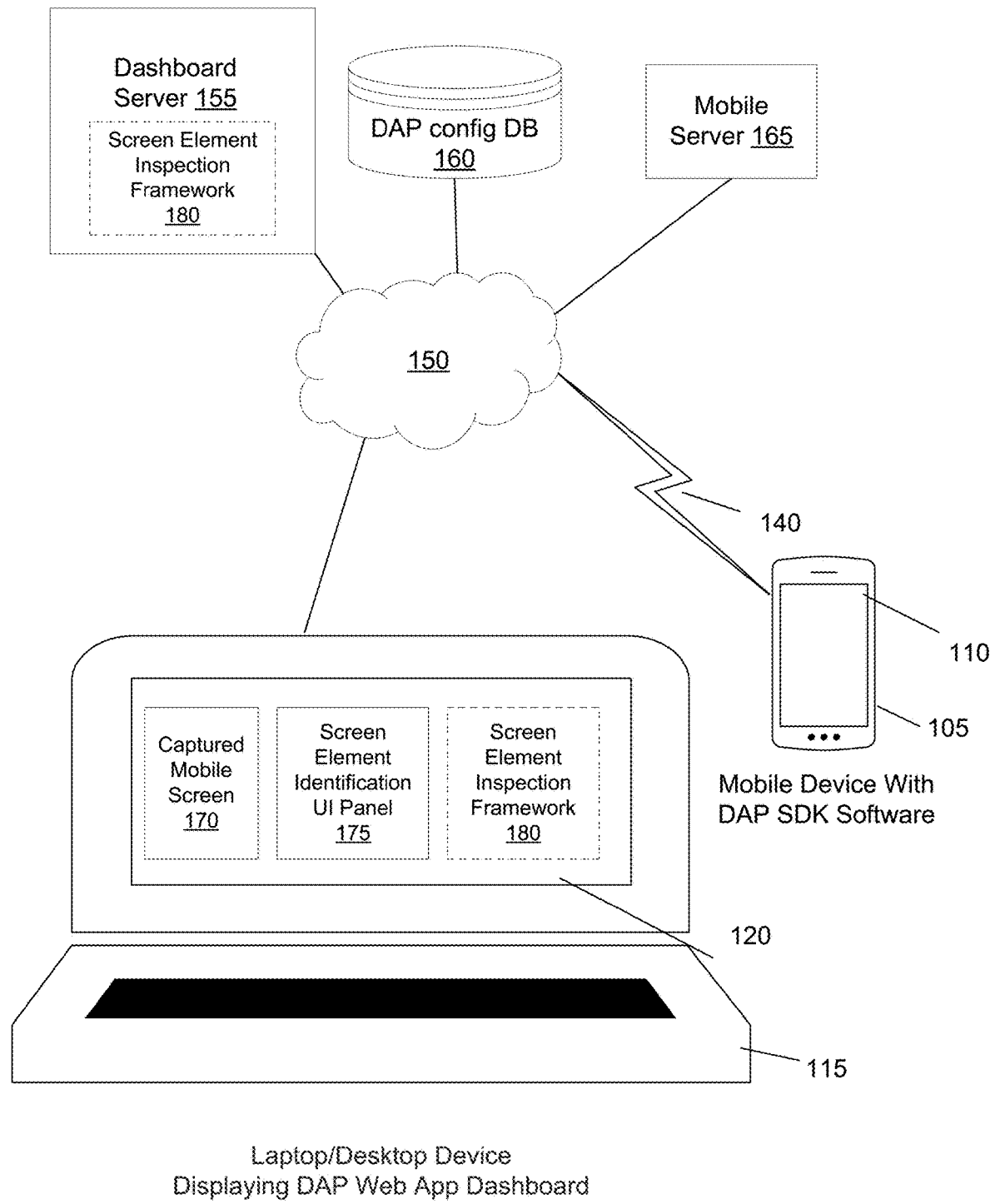
FIG. 1 illustrates aspects of an approach to support a screen element inspection framework for mobile devices in accordance with an implementation.

FIG. 1 illustrates a technique for using a captured screen-shot 170 of a mobile device screen 110 of a mobile computing device 105 to inspect screen elements of the mobile device using a larger display screen 120 of a computer 115. Mobile computing device 105 may, for example be a smartphone, but more generally it could be other types of small screen mobile computing devices, such as mobile tablet devices. Computer 115 may, for example be a desktop computer or laptop computer (although for ease of description, the term "desktop computer" and "desktop" is used broadly). The mobile computing device 105 may, for example, have a global internet connection (e.g., via a wireless link 140). The mobile computing device 105 may operate a software development kit (SDK) to support DAP.

An inspect element framework is used to identify selected elements of a representation of mobile screen 170 and their associated element attributes, which in turn may be used to generate DAP configuration data to aid creating mobile device DAP content on a web dashboard. The inspect element framework may, for example, include a screen element identification (UI) feature 175 displayed on the dashboard in some implementations. This may include, for example, display screen identification information, such as a listing of screen elements selected, their names, and other relevant information about their attributes.

Software to perform aspects of a screen element inspection framework 180 may be implemented in different ways, such as via a dashboard of a web application, although some types of calculations, such as calculating a cursor location relative to a captured mobile screen 170 may be performed in different ways, such as by the web application alone or with assistance from resources on computer 115 or with resources of a dashboard server 155.

In one implementation, the overall mobile DAP solution includes a dashboard server 155 and a mobile server 165. The dashboard server is a central server through which data is written to/read from the DAP configuration (config) database. This dashboard server communicates with the dashboard for curating the DAP config and storing the content in the DAP config DB. The mobile server 165 is a central server through which DAP config data is fetched by the mobile SDK.

Support for implementing DAP content creation/editing may be provided by the DAP config database 160. The DAP config DB stores DAP content and all configuration data related to it. A DAP identifier may be stored in the DAP config DB with the DAP identifier being a unique element via which a screen can be identified.

In some implementations, the dashboard server, 155, mobile server 165, and DAP configuration database 160 may be accessed via a network connection 150 (e.g., via the Internet, through cloud-based services, etc.).

As illustrated in FIG. 1, the computer 115 may run a DAP dashboard through, for example, a web application. The mobile computing device 105 may, for example, be a smartphone having a built-in camera, a capability to read optical image codes (e.g., QR codes or other optical image codes), a user interface, processors, memory to store computer code, and a wireless communication capability. The mobile computing device 105 may have installed on it an application packaged with SDK executing on the mobile computing device 105 with software to support screen capture.

In one implementation, the SDK integrates DAP into a mobile application. The SDK may be provided to mobile application developers to integrate DAP functionality into their mobile application. That is, application developers insert a few lines of code in their application code to integrate the SDK into their application code. When the application is installed on the mobile device, DAP content is shown on the mobile app.

In one implementation, the dashboard is implemented as a web application for a content author to create DAP content for their mobile applications by accessing the DAP dashboard (referred to as a "dashboard" further on).

Figure 2:
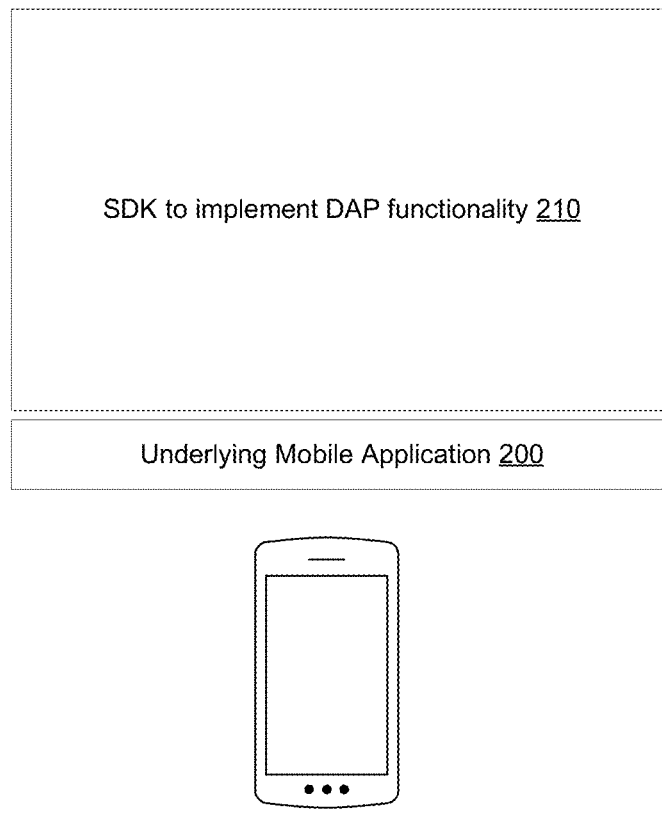
FIG. 2 is a high-level example of SDK for a mobile device in accordance with an implementation.

FIG. 2 is a high-level image showing an underlying mobile application 200 for a mobile computing device, the SDK kit 210 to implement the overall DAP functionality on the underlying mobile application.

Figure 3:
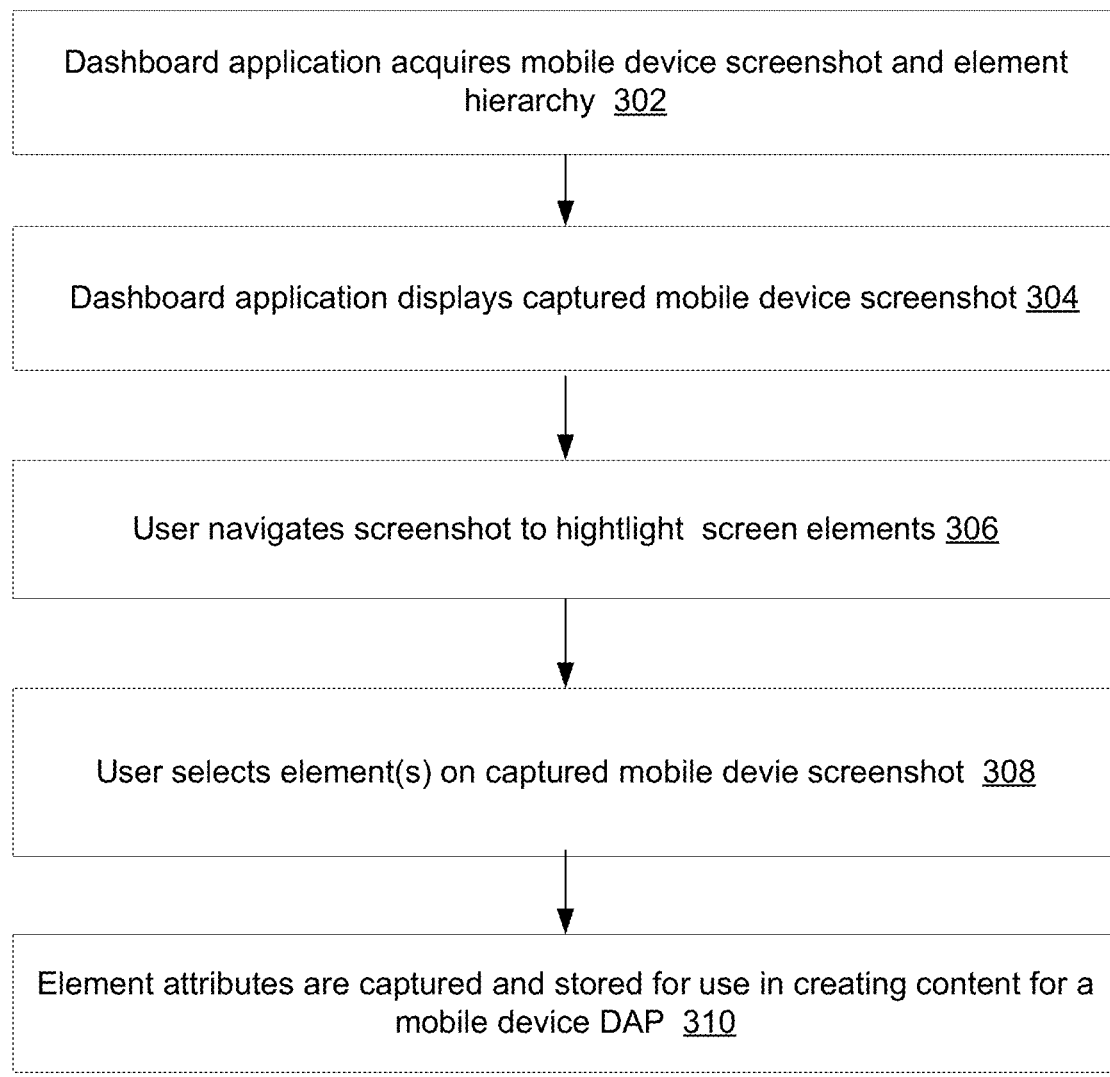
FIG. 3 is a high-level flow chart of a method of performing mobile device screen element inspection in accordance with an implementation.

FIG. 3 is a flow chart of an example of a high-level method in accordance with an implementation. In block 302, the DAP dashboard application acquires a mobile device screen-shot and element hierarchy. In some implementations, a content author issues a capture screen-shot command from the dashboard that results in the capture of a screen-shot and an element hierarchy. In block 304, the dashboard application displays the screen-shot of the mobile device. The screen-shot is displayed at a representation of the mobile device screen. In block 306, the user navigates through the screen-shot to highlight screen elements, such as by moving a user interface pointer using a pointer device such as a trackball or a mouse. This may include performing calculations to identify where the pointer is on the screen with respect to visible screen elements of the screen-shot. In block 308, a user selects elements(s) of the screen-shot, such as by clicking on a screen element. In block 310, element attributes are captured and stored for use in creating content for a mobile device DAP.

The basic process of FIG. 3 can be repeated, if desire, to identify all of the screen elements that a DAP content author generates content for. The process may also be repeated for each mobile device screen of a mobile device application.

Figure 4:
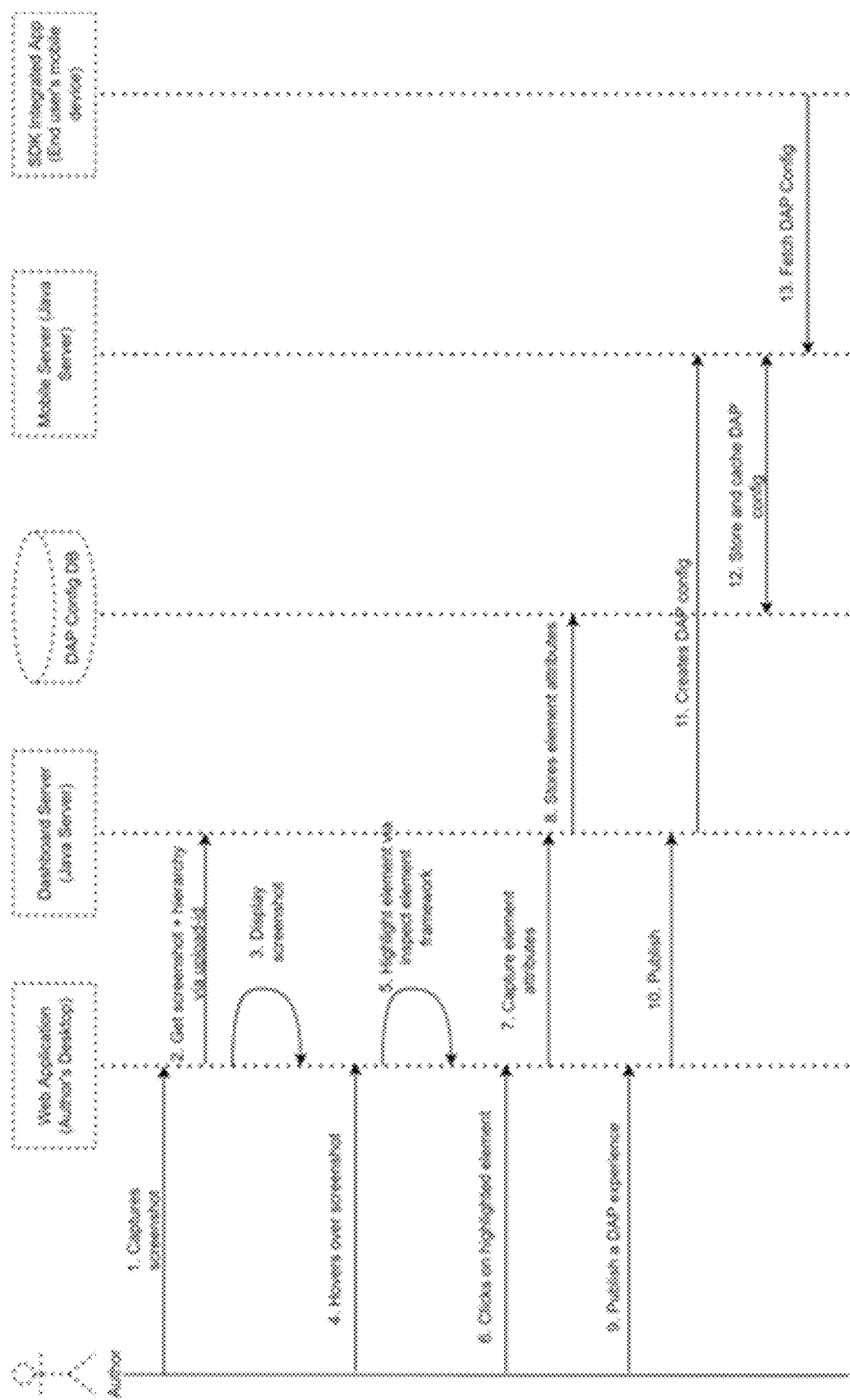
FIG. 4 is an interaction diagram illustrating a method of screen element inspection in accordance with an implementation.

FIG. 4 illustrates an example of a sequence of interactions between a web application (the content creator's desktop from which they access the dashboard), a dashboard server (e.g., a Java server), a mobile server (e.g., a Java server), and an SDK integrated into the content author's mobile computing device (e.g., an Android® or iOS® mobile device). A DAP configuration database is also illustrated as part of an overall DAP solution.

Arrow 1 illustrates an author accessing the dashboard on their web application and issuing a command to capture a screen-shot of the mobile device.

As illustrated by arrow 2, the dashboard gets the screen-shot and the element hierarchy via the dashboard server. The screen-shot and element hierarchy may be captured and provided to the dashboard using a variety of different techniques known in the art. An example of a technique to capture a screen-shot of a mobile device (and a mobile screen hierarchy) via a QR code and provide access via an upload identifier (ID) is described in detail in co-pending U.S. patent application Ser. No. 18/170,382, "System and Method for QR Code Based Mirroring of Mobile Screen To Computer," filed Feb. 16, 2023, by the assignee of the current application, the contents of which are hereby incorporated by reference. In one implementation, the SDK uploads a high-resolution screen-shot along with the hierarchy of the mobile application screen to the dashboard server, which returns back a unique upload ID. The SDK sends the upload ID to the dashboard, e.g., via a socket connection. The dashboard fetches the uploaded screen-shot and element hierarchy from the dashboard server. A benefit of this approach is that it doesn't require large amounts of data to be sent by socket communication. Instead, the payload is sent via secure HTTP and the upload ID is sent via the socket connection.

As illustrated by arrow 3, the screen-shot is displayed on the dashboard of the web application and the hierarchy of the screen-shot is captured. Screen-shot is used to generate a representation of the mobile screen that can be used to inspect screen elements by performing user interface operation such as moving a pointer over the screen-shot, having elements the pointer is over being highlighted, and selecting element using user interface commands such as clicking on a highlighted element.

As illustrated by arrow 4 in one implementation, a content author hovers their pointer over a screen-shot order to select identifiers for that particular screen. For example, in a mouse paradigm, the user moves the pointer with a mouse. However, other techniques to move a pointer could be used, such as a trackball.

As illustrated by arrow 5, in one implementation hovering over a visual display element of the screen-shot results in it being highlighted via the inspect element framework.

As indicated by arrow 6, a content author selects a highlighted element (e.g., by clicking on it). This may also in some implementations result in the name of the element (or other unique element attributes) being displayed on a user interface box or panel.

As illustrated by arrow 7, the element attributes of selected elements (as well as any applicable reference elements) are captured by the dashboard server. The process of selecting elements can be repeated, as desired, for a content author to identify all of the elements of the screen that need to be identified for creating DAP content for each mobile screen of a mobile application. In one implementation, a content author can delete or edit a selected element to strengthen the identification. In one implementation, the inspect element framework is used to highlight a selected element and show its unique attributes. This may, for example, include generating a box or panel showing the selected elements, their attributes, and their identification.

As illustrated in arrow 8, the element attributes are stored in the DAP config DB.

After the screen identification, the content author can begin to create DAP content for that screen and click on publish, as illustrated by arrow 9.

As illustrated by arrow 10 in one implementation, the dashboard sends a publish message to the server for that DAP content.

As illustrated by arrow 11, in one implementation, once published, the dashboard server fetches all the DAP content for that experience and creates a DAP config file and then sends it to the mobile server.

As illustrated in arrow 12, in one implementation, the mobile server stores caches this in the DAP config DB.

As illustrated in arrow 13, in one implementation, the mobile SDK fetches this DAP config from the mobile server and displays the DAP content on the mobile application.

It should be noted that the process can be repeated, if desired, to identify all of the relevant elements of all of the screens of a mobile application for which DAP content is created.

In one implementation, the inspect element framework includes various features to determine where a user's cursor is relative to the screen-shot of the mobile device, make decisions about what elements to highlight (and how to highlight them in some examples). The inspect element framework includes features for a user to select a highlighted element (e.g., by clicking). The inspect element framework in some implementations includes a capability for a user to view the element attributes of a selected screen element, such as in an identification pane in the desktop user interface. This capability aids a content author to develop DAP content that appears when a user mouses over specific screen elements of a mobile screen.

One aspect of the inspect element framework is that the dashboard calculates in in real time the coordinates (x,y) of the mouse pointer. In one implementation, the dashboard also normalizes the location information of every element in the element hierarchy according to the width and height of the screen-shot displayed on the dashboard. In one implementation, the dashboard matches the calculated (x,y) coordinates with the normalized bounds of all elements in the hierarchy. In one implementation, the inspect element framework filters out nonvisible elements (unrelated elements) from the screen. The screen element hierarchy may also be optimized to include only visible elements on the screen.

In one implementation, the dashboard prepares a list of matched elements that contains the pointer (e.g., a mouse pointer) inside their respective boundaries. The dashboard then calculates the areas of all the matched elements and selects the one with the minimum area. This is to make sure that the element detection is accurate.

In one implementation, the inspect element framework attempts to identify which set of attributes are unique to the element. However, different mobile device platforms typically have different element attributes. Thus, for example, a DAP content author could specify a platform type and the inspect element framework would customize its operation for the specified platform type.

For the Android® platform, in one example implementation the inspect element framework tries the attribute combination in the following order:
'Tag,class'
'Id,class'
'Content_desc,class'
'Id,Tag,class'
'Id,Content_desc,class'
'Tag,Content_desc,class'
'Text,class'

For the iOS platform, in one example implementation the inspect element tries the attribute combination in the following order:
'Tag,class'
'Acc_id,class'
'Acc_label,class'
'Text,class'
'Acc_id,Acc_label,class'
'Acc_id,Tag,class'
'Acc_label,Tag,class'

In one implementation, if the inspect element framework is able to find the element attribute set unique to the smallest area element, it highlights it with a green boundary. It would be understood that other highlighting colors to indicate success could be used, but the color green has positive connotations. Also, other technical options are possible to indicate success, such as flashing highlighting on and off, adding hatching, using dashed lines, etc.

In one implementation, if the inspect element framework is not able to find any attribute set unique to the smallest area element, it checks for the nearest uniquely identifiable element and stores the path from that to the current element. This identification might not be very strong as the current itself is not uniquely identifiable and is dependent on another unique element (reference element) in its vicinity. In one implementation, the dashboard shows it by coloring the boundary of the current element as orange, so that the author may be able to choose a better element for identification. It will be understood that other colors besides orange could be used. More generally, the highlighting for this case could be any highlighting scheme indicating to the user that the inspect element framework was not able to find any attribute set unique to the smallest area element, but found a nearest uniquely identifiable element and the path from that to the current element. Orange is merely a convenient color, and many other types of highlighting or other changes in visual appearance could be used for the same purpose.

In one implementation, the inspect element framework can also detect if the element being hovered on is a web element or a native element and then highlights it accordingly. For web elements, the attribute set is dynamic and depends upon the DOM information of that web element. In one implementation, if the web element is not uniquely identifiable, then the framework marks the element as "Non Identifiable" and shows it visually to the content author by marking its boundary in red. Again, red is merely a convenient color. Other color schemes or changes in visual appearance could be used to indicate an element is non identifiable.

For the case of web elements, the inspect element framework does not use reference elements as web elements are more dynamic and reference path can also change very frequently. It will also be understood that marking a boundary is red is one of many possible options for visually indicating an element is non-identifiable.

Figure 5A:
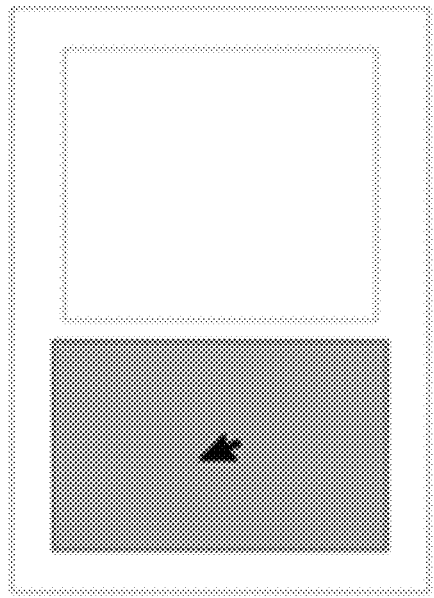
FIGS. 5A, 5B, 5C, and 5D illustrate examples of how element highlighting is performed in accordance with an implementation.
Figure 5B:
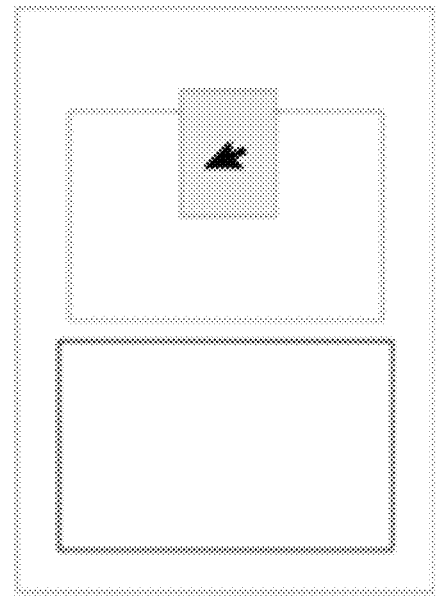

FIG. 5A illustrates an example of a mouse pointer position in the left-hand box. As illustrated in FIG. 5B, in this example the element is highlighted when the user hovers their mouse over the element.

Figure 5C:
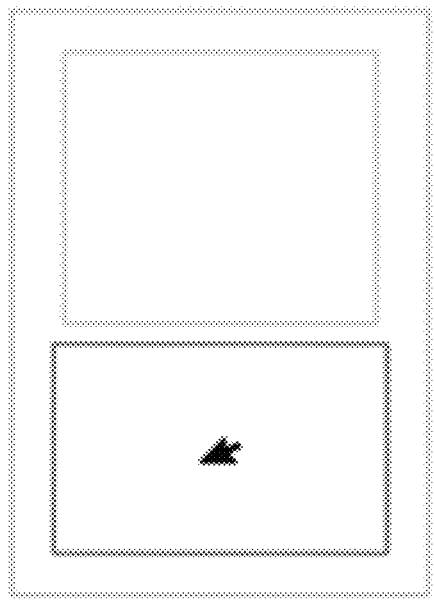
Figure 5D:
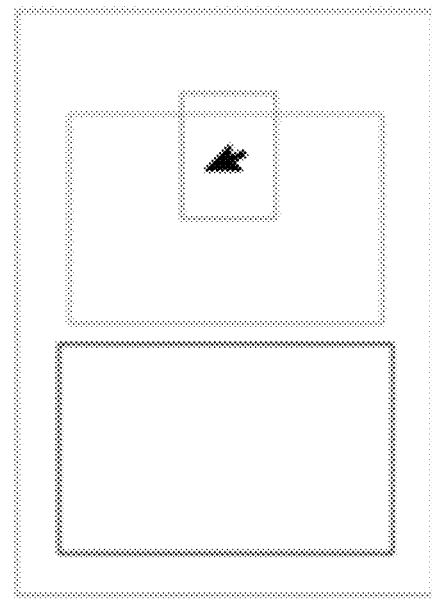

FIG. 5C illustrates the mouse pointer position over the positions of a small area element that overlaps with a larger area element. As illustrated in FIG. 5D, the inspect element framework selects the smallest element the pointer is in to highlight.

Figure 6:
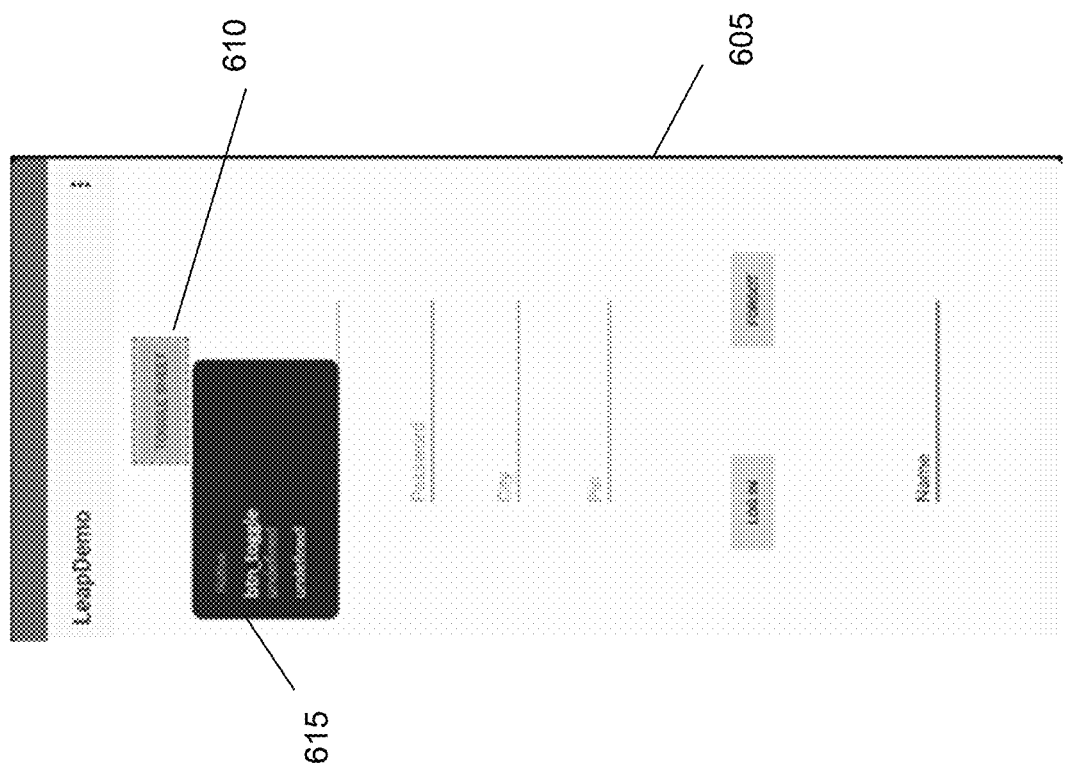
FIG. 6 illustrates aspects of highlighting an element of mobile screen representation in accordance with an implementation.

FIG. 6 illustrates an example in which mousing to the "Toggle Sheet" UI screen element results it being highlighted green to indicate the inspect element framework was able to find the element attribute set unique to the smallest area element, it highlights it with a green boundary. In this example, additional information is displayed indicating a native button (btn toggle) is highlighted. In this example, the Toggle Sheet button is highlighted green and with a green-dashed border.

Figure 7:
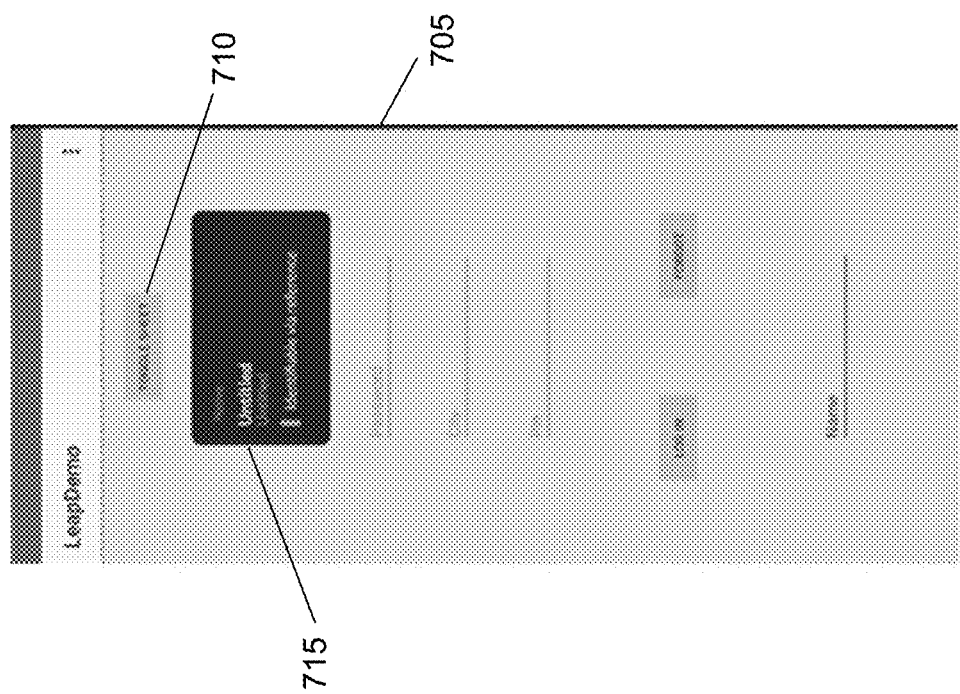
FIG. 7 illustrates aspects of highlighting an element of mobile screen representation in accordance with an implementation.

FIG. 7 illustrates inspect element framework is not able to find any attribute set unique to the smallest area element, it checks for the nearest uniquely identifiable element and stores the path from that to the current element. In this example, the Toggle Sheet button is identifiable via a reference to the overall container, which is highlighted in orange. In this example, additional information is displayed to indicate that the element is identical via a reference.

Figure 8:
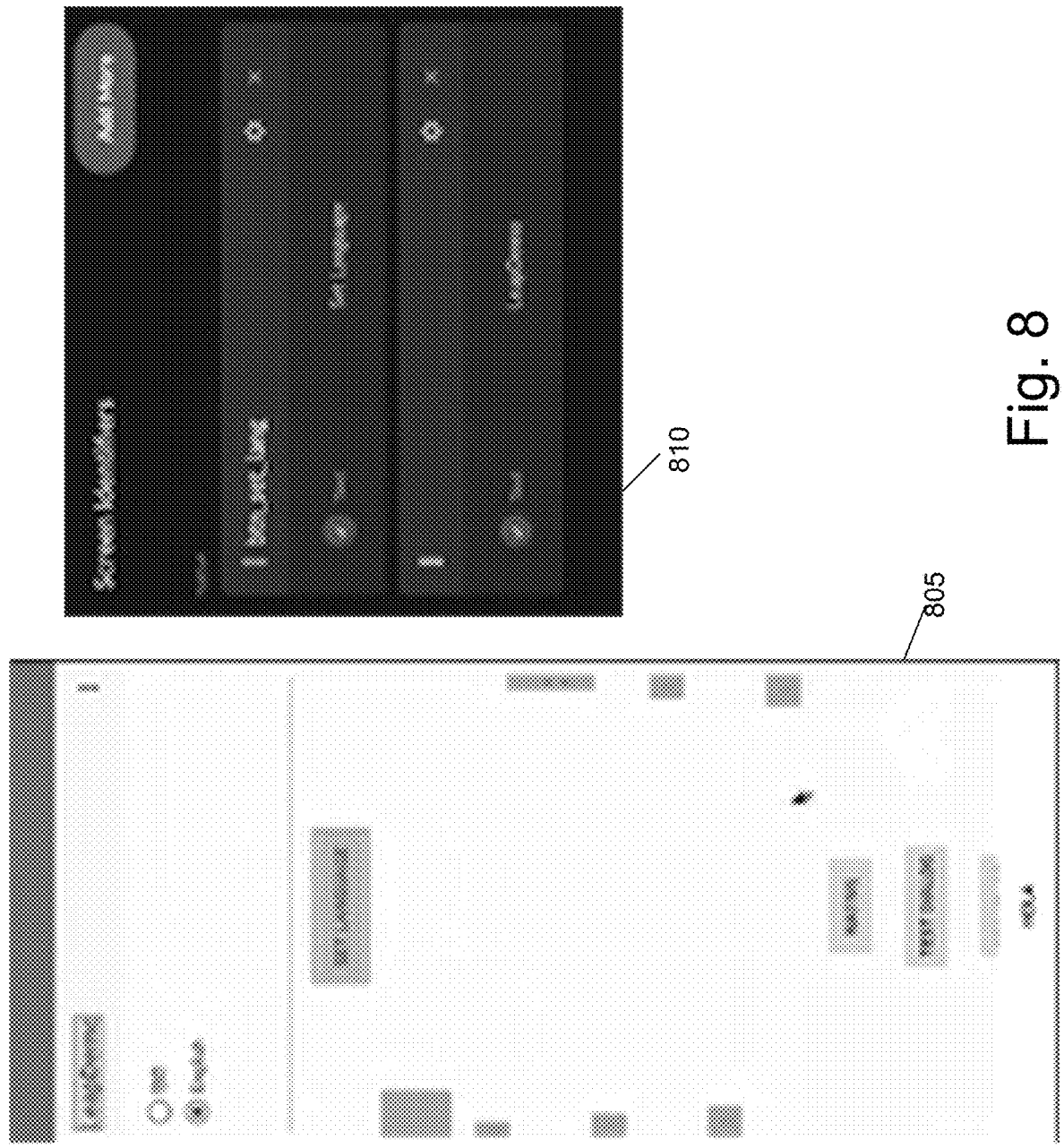
FIG. 8 illustrates an example of screen identification in accordance with an example.

FIG. 8 illustrates an example in which there is a green highlighting of a "Set Language" button and orange highlighting of a "LeapDemo" button. In this example, a screen panel of screen identifiers may summarize the selected and highlighted screen elements.

Figure 9:
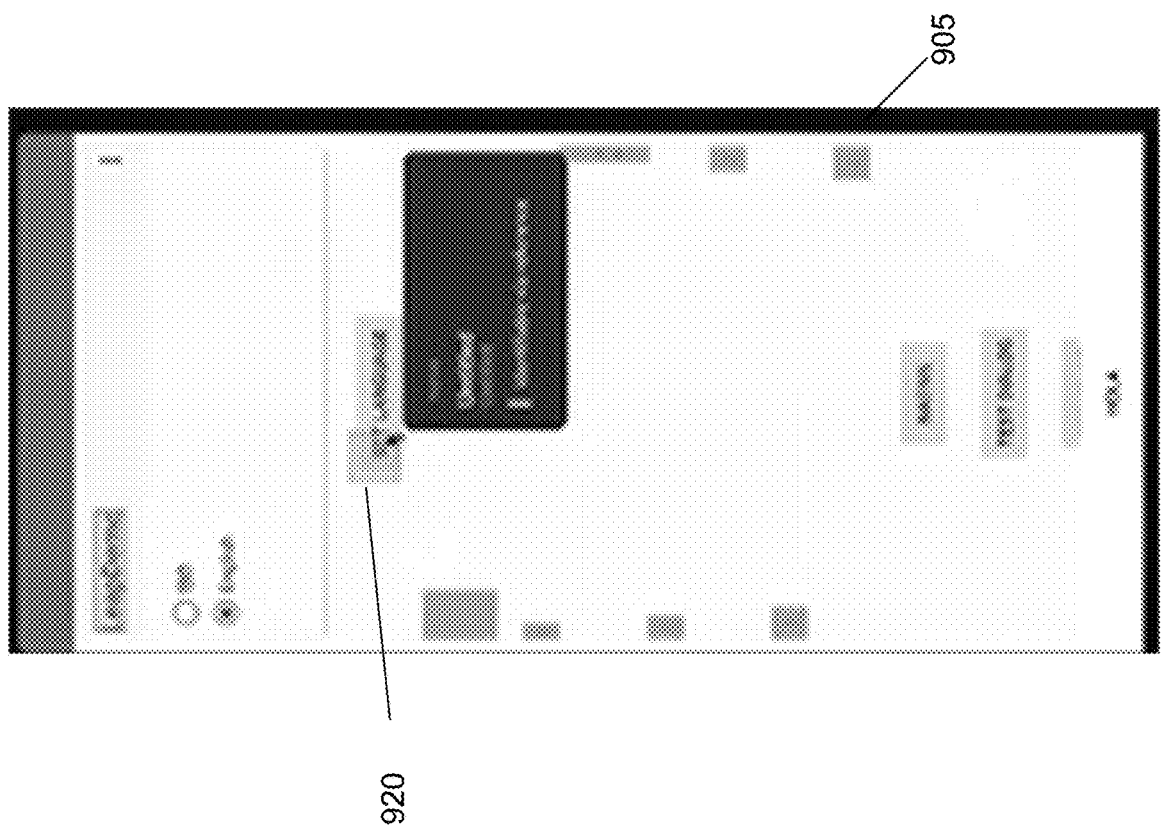
FIG. 9 illustrates aspects of highlighting an element of mobile screen representation in accordance with an implementation.

FIG. 9 illustrates an example in which there are overlapping screen elements. Positioning the pointer on the far left of the "Set Language" button results in a small overlapping screen element being highlighted in orange.

Figure 10:
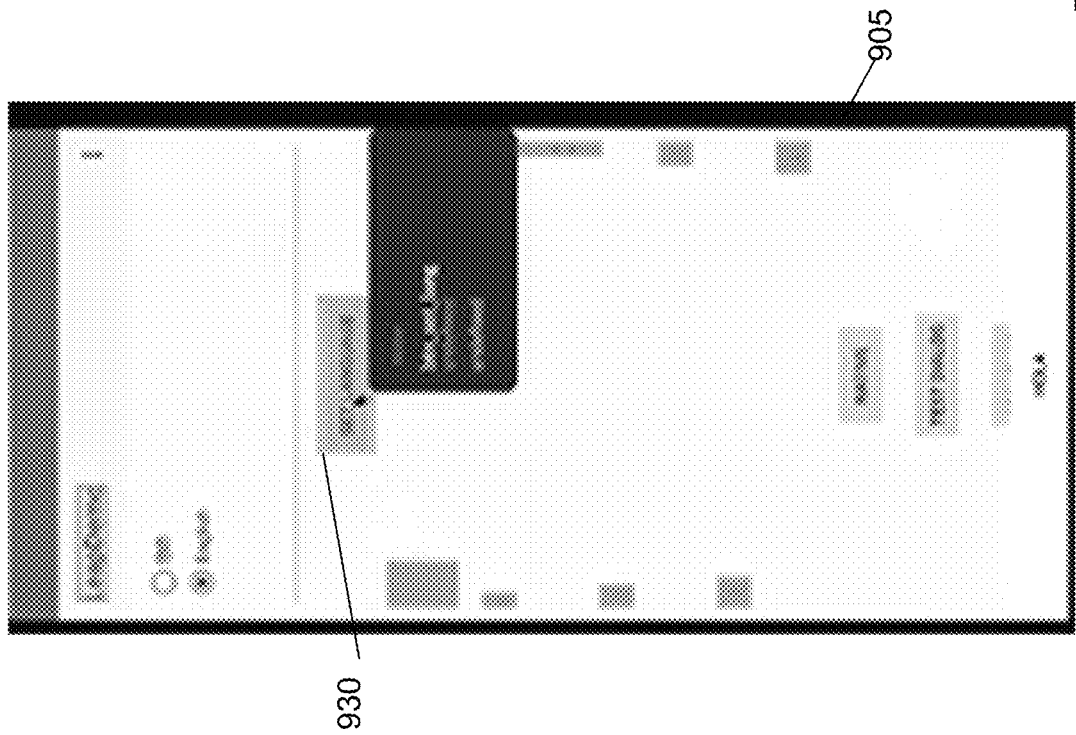
FIG. 10 illustrates aspects of highlighting an element of mobile screen representation in accordance with an implementation.

FIG. 10 illustrates an example in which the mouse is positioned differently on the "Set Language" element, resulting in the entire element being highlighted green. This illustrates how the inspect element framework attempts to fine the smallest element the mouse pointer is over.

Figure 11A:
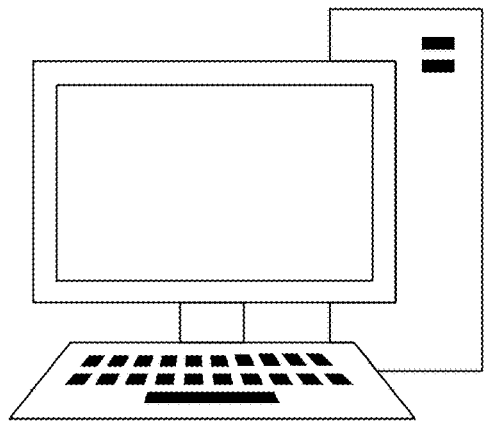
FIGS. 11A and 11B illustrates a general server environment for implementing a dashboard server in accordance with an implementation.
Figure 11B:
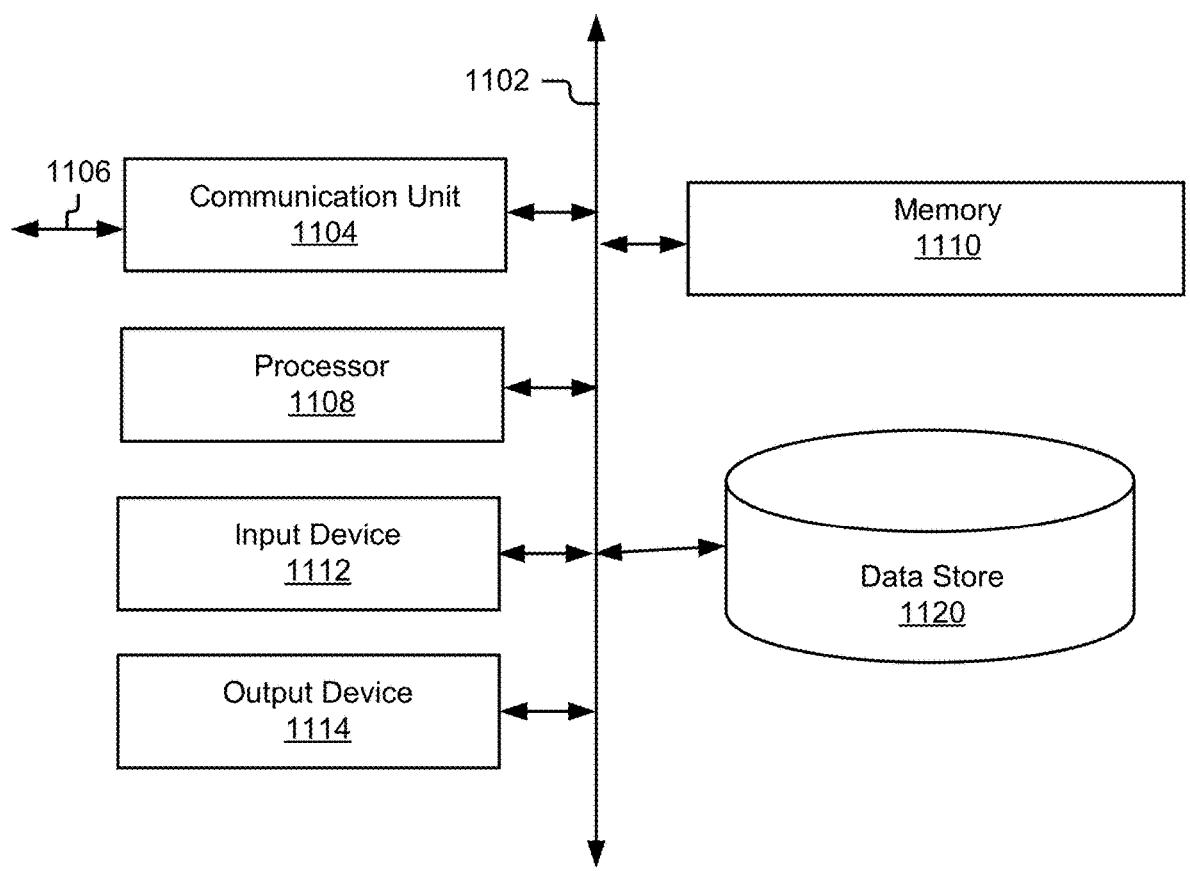

Referring to FIGS. 11A and 11B, it will be understood that the dashboard server may be implemented using a conventional server architecture, which may include a communication bus 1102, a processor 1108, input device 1112, output device 1114, memory 1110, data store 1120, and communication unit 1104 to support a network connection 1106. It will be understood that the dashboard server may include computer program instructions executable on the processor to implement the methods implemented by the dashboard server.

One of the benefits of the inspect element framework is that it filters out any unrelated views from the screen while inspecting. Another benefit is that it has the ability to inspect web elements present inside a hybrid application.

The inspect element framework may be used to support mobile apps implemented in different platforms, such as Android® Apps and iOS® Apps. As examples, the mobile apps could be built using native Android/IOS platforms; cross platform frameworks like react native, Cordova®, Ionic®, Xamarin®; or hybrid application technologies like embedding a web application inside the mobile app.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method of inspecting a mobile device screen by a larger screen device to identify screens for a mobile digital adoption platform (DAP), comprising:
   capturing a screen-shot of a mobile computing device having an associated screen element hierarchy for screen elements of the screen-shot;
   displaying, on a display screen of a computer, the screen-shot of the mobile computing device;
   determining a user interface pointer position and matching the user interface pointer position with boundaries of visible screen elements of the screen-shot;
   highlighting elements of the screen-shot in response to a user hovering a user interface pointer over a screen element, wherein the highlighting elements of the screen-shot comprises identifying a smallest element the user interface pointer is hovering over;
   receiving at least one user interface command, via the computer, to select a highlighted element of the screen-shot; and
   capturing element attributes associated with the selected highlighted element.

2. The method of claim 1, wherein at least one user interface command comprises a command to click on an element of the screen-shot to select it.

3. The method of claim 1, further comprising displaying element attributes of the selected highlighted element.

4. A method of inspecting a mobile device screen by a larger screen device to identify screens for a mobile digital adoption platform (DAP), comprising:
   capturing a screen-shot of a mobile computing device having an associated screen element hierarchy for screen elements of the screen-shot;
   displaying, on a display screen of a computer, the screen-shot of the mobile computing device;
   detecting if an element is a web element or a native element, and in response identifying to a user whether the element is a web element or a native element;
   receiving at least one user interface command, via the computer, to select an element of the screen-shot; and
   capturing element attributes associated with the selected element of the screen-shot.

5. The method of claim 4, wherein the detecting and identifying occur in response to a user hovering a user interface pointer over a screen element.

6. The method of claim 4, further comprising, in response to identifying a web element, determining whether the web element is identifiable.

7. The method of claim 6, further comprising in response to determining the web element is non-identifiable, generating an indication that the web element is non-identifiable.

8. A method of inspecting screen elements of a mobile device for a mobile digital adoption platform (DAP), comprising:
   initiating, in response to a user command, a capture of a screen-shot of a mobile computing device having an associated screen element hierarchy for screen elements of the screen-shot;
   displaying the screen-shot on a dashboard of a display screen of a computer;
   determining coordinates of a user interface pointer of the computer with respect to the screen-shot displayed on the display screen of the computer;
   in response to the user interface pointer hovering over a visible screen element of the screen-shot, highlighting the screen element, wherein the highlighting comprises identifying a smallest element the user interface pointer is hovering over; and
   in response to a user selecting the highlighted element, capturing element attributes of the highlighted element.

9. The method of claim 8, wherein the selecting comprises a command to click on an element of the screen-shot to select it.

10. The method of claim 8, further comprising displaying element attributes of the selected element on the screen of screen of the computer.

11. A method of inspecting screen elements of a mobile device for a mobile digital adoption platform (DAP), comprising:
   initiating, in response to a user command, a capture of a screen-shot of a mobile computing device having an associated screen element hierarchy for the screen elements of the screen-shot;
   displaying the screen-shot on a dashboard of a display screen of a computer;
   determining coordinates of a user interface pointer of the computer with respect to the screen-shot displayed on the display screen of the computer;
   in response to the user interface pointer hovering over a visible screen element of the screen-shot, highlighting the screen element;
   detecting if a highlighted element is a web element or a native element, and in response identifying to the user whether the element is a web element or a native element; and
   in response to a user selecting the highlighted element, capturing element attributes of the highlighted element.

12. The method of claim 11, further comprising, in response to identifying a web element, determining whether the web element is identifiable.

* * * * *